US012394922B2

(12) United States Patent
Jung et al.

(10) Patent No.: US 12,394,922 B2
(45) Date of Patent: Aug. 19, 2025

(54) FIXED CONNECTOR AND CONNECTOR ASSEMBLY INCLUDING SAME

(71) Applicant: GigaLane Co., Ltd., Hwaseong-si (KR)

(72) Inventors: Kyung-hun Jung, Hwaseong-si (KR); Hwa-yoon Song, Hwaseong-si (KR); Hee-seok Jung, Hwaseong-si (KR)

(73) Assignee: GigaLane Co., Ltd., Hwaseong-si (KR)

( * ) Notice: Subject to any disclaimer, the term of this patent is extended or adjusted under 35 U.S.C. 154(b) by 391 days.

(21) Appl. No.: 17/934,600

(22) Filed: Sep. 23, 2022

(65) Prior Publication Data

US 2023/0100478 A1 Mar. 30, 2023

(30) Foreign Application Priority Data

Sep. 24, 2021 (KR) ........................ 10-2021-0126269
Feb. 3, 2022 (KR) ........................ 10-2022-0014413

(51) Int. Cl.
*H01R 12/58* (2011.01)
*H01R 12/70* (2011.01)

(52) U.S. Cl.
CPC ........... *H01R 12/58* (2013.01); *H01R 12/707* (2013.01)

(58) Field of Classification Search
CPC ...... H01R 24/50; H01R 24/40; H01R 12/716; H01R 9/05; H01R 24/38; H01R 12/714
See application file for complete search history.

(56) References Cited

U.S. PATENT DOCUMENTS 6,164,977 A * 12/2000 Lester .................. H01R 24/542 439/63
6,264,475 B1 * 7/2001 Machado ............... H01R 24/52 439/63
6,474,995 B1 * 11/2002 Wu ........................ H01R 24/50 439/63
6,776,621 B1 * 8/2004 Dye ....................... H01R 24/50 439/63
6,905,364 B2 * 6/2005 Swantner ............... H01R 24/50 439/541.5
2008/0268705 A1 * 10/2008 Yamane ................. H01R 4/028 439/578

(Continued)

FOREIGN PATENT DOCUMENTS

CN 113054473 A 6/2021
DE 10312515 A1 10/2004

(Continued)

OTHER PUBLICATIONS

Partial European Search Report (PESR) issued on Feb. 3, 2023, in connection with the EP Application No. 22197307.6, 50 pages.

(Continued)

*Primary Examiner* — Truc T Nguyen
(74) *Attorney, Agent, or Firm* — Shih IP Law Group, PLLC.

(57) ABSTRACT

The present invention relates to a fixed connector including a body fixedly inserted into a substrate, a signal pin having one side inserted into the body and the other side extending from the one side to be disposed on the substrate, and a dielectric coupling the signal pin and the body, wherein a portion of the signal pin has an L shape to be in contact with the substrate, and the portion of the signal pin is exposed to an outside of the body.

11 Claims, 18 Drawing Sheets

(56) References Cited

U.S. PATENT DOCUMENTS

| | | | | |
|---|---|---|---|---|
| 2009/0117779 | A1* | 5/2009 | Zhang | H01R 24/50 439/581 |
| 2014/0273550 | A1* | 9/2014 | Biddle | H01R 12/7005 439/63 |
| 2014/0342613 | A1 | 11/2014 | Chuang | |
| 2015/0072544 | A1* | 3/2015 | Tsai | H01R 24/50 439/83 |
| 2015/0104974 | A1* | 4/2015 | Hirakawa | H01R 9/0512 439/578 |
| 2018/0048101 | A1* | 2/2018 | Maruyama | H05K 3/308 |
| 2019/0305457 | A1* | 10/2019 | Song | H01R 24/50 |
| 2020/0021049 | A1* | 1/2020 | Song | H01R 13/6594 |
| 2021/0249827 | A1* | 8/2021 | Haga | H01R 24/40 |
| 2022/0200174 | A1* | 6/2022 | Cha | H01R 12/55 |
| 2023/0100478 | A1* | 3/2023 | Jung | H01R 12/7052 439/83 |
| 2023/0238753 | A1* | 7/2023 | Cha | H01R 12/716 439/78 |

FOREIGN PATENT DOCUMENTS

| | | | |
|---|---|---|---|
| KR | 20040057956 | A | 7/2004 |
| KR | 200404096 | Y1 | 12/2005 |
| KR | 1020110089450 | A | 8/2011 |
| KR | 20130084929 | A | 7/2013 |
| KR | 101311724 | B1 | 9/2013 |
| KR | 101898940 | B1 | 10/2018 |
| KR | 101922142 | B1 | 11/2018 |
| KR | 101938537 | B1 | 4/2019 |
| KR | 102006134 | B1 | 8/2019 |
| KR | 102309404 | B1 | 10/2021 |

OTHER PUBLICATIONS

Notice of Allowance issued on Jan. 30, 2023, in connection with the KR Application No. 10-2022-0014413, 10 pages.

* cited by examiner

FIXED CONNECTOR AND CONNECTOR ASSEMBLY INCLUDING SAME

CROSS-REFERENCE TO RELATED APPLICATIONS

This application claims the benefit under 35 U.S.C. § 119 of Korean Patent Application No. 10-2021-0126269 filed on Sep. 24, 2021, and Korean Patent Application No. 10-2022-0014413 filed on Feb. 3, 2022, in the Korean Intellectual Property Office, the disclosures of which are incorporated herein by reference.

TECHNICAL FIELD

The present invention relates to a fixed connector and a connector assembly including the same.

BACKGROUND

In general, radio frequency (RF) connectors are used in various forms on a substrate (printed circuit board (PCB)) of wired/wireless communication devices (for example, mobile communication repeaters). One side of the RF connector may be soldered and fixed to a substrate, and the other side thereof may be coupled to a device (for example, a connector).

In the case of a surface mount technology (SMT) method among methods in which an RF connector is soldered to a substrate, since a bonding region between the RF connector and the substrate is small, when an impact or heat is applied to structure corresponding portion, electrical contact may become unstable at a soldered portion or the substrate and the RF connector may be separated from each other.

To solve this problem, although a PCB thru hole (PTH) method in which a signal pin and a lead of an RF connector passes through a substrate (PCB) has been used, since the PTH method requires an additional wave soldering process, a pin-in-paste (PIP) waveless soldering method that supplements this is being used.

However, in the case of the PIP method, since the length of the signal pin of the RF connector is shortened, the characteristics of a specific frequency are degraded. In particular, in the PIP method, the characteristics of a massive multi input multi output (MIMO) unit (MMU) are greatly degraded.

The background art of the present invention has been written to facilitate understanding of the present invention. It should not be understood that the matters described in the background art of the present invention are present as the related art.

RELATED ART DOCUMENT

[Patent Document]
(Patent Document 1) KR10-1311724B1
(Patent Document 2) KR10-1898940B1
(Patent Document 3) KR10-1938537B1

Technical Problem

The present invention is directed to providing a fixed connector having a novel structure capable of maximizing a fixing force (soldering strength) between a connector and a substrate while maintaining ease of manufacturing, and a connector assembly including the same.

The aspects of the present invention are not limited to the aspects described above, and those skilled in the art will clearly understand other aspects not given from the following description.

Technical Solution

One aspect of the present invention provides a fixed connector including a body fixedly inserted into a substrate, a signal pin having one side inserted into the body and the other side extending from the one side to be disposed on the substrate, and a dielectric coupling the signal pin and the body, wherein a portion of the signal pin has an L shape to be in contact with the substrate, and the portion of the signal pin is exposed to an outside of the body.

The signal pin may include a first signal pin inserted into the body, and a second signal pin disposed on the substrate and electrically connected to the first signal pin.

In the first signal pin and the second signal pin, an end portion of the first signal pin may be coupled to the second signal pin through a hole formed in the second signal pin.

The body may include a body part surrounding a first signal pin, which is inserted into the body, among the signal pin, and a plurality of leads integrally formed with the body part, connected to a lower portion of the body part, and inserted into the substrate.

The body part may have a vertical cross section that is symmetrical in a left-right direction with respect to a central axis in a direction in which a second signal pin, which is disposed on the substrate, among the signal pin is oriented.

The plurality of leads may be each formed in a rod shape at an edge of a bottom surface of the body part and are asymmetric in the left-right direction.

A cross section of one or more of the plurality of leads may be different from a cross section of the remaining leads.

In the signal pin, one region of a second signal pin disposed on the substrate may have an arcuate shape.

The dielectric may be disposed to surround a lower end of the signal pin, and a cross section of a protruding region of the dielectric may be identical or similar to a cross section of an inner space of the body so that the dielectric is fixedly fitted into the inner space of the body.

The dielectric may include a first dielectric surrounding the first signal pin, and a second dielectric surrounding the second signal pin, and a shape of a bottom surface of the second dielectric coupling the second signal pin may correspond to a shape of a groove formed in the body part.

The body may have a groove for coupling with the dielectric.

The dielectric may have a press-fitting protrusion for coupling with the body in a direction toward an upper end of the body.

The groove and the press-fitting protrusion may be arranged at a location corresponding to a second signal pin, which is disposed on the substrate, among the signal pin.

One region of the dielectric for coupling a second signal pin, among the signal pin, disposed on the substrate to the body may have at least a partial shape of a circle.

In the dielectric, at least one circular groove may be formed in a bottom surface corresponding to the substrate or an annular groove may be formed to be open in a direction in which the second signal pin disposed on the substrate is oriented on the basis of a center of a first signal pin, which is inserted into the body, among the signal pin.

The body may include a second groove through which the second signal pin, which is disposed on the substrate, among the signal pin passes, and a first groove formed in one side of a bottom surface of the body facing the second groove formed in the other side of the bottom surface of the body.

The body may have an air gap between the body and the dielectric disposed on a second signal pin, which is disposed on the substrate, among the signal pin.

The body part may have a plurality of grooves between the plurality of leads, and among the plurality of grooves, grooves through which the second signal pin passes may have a greater width or height than that of the remaining grooves.

Advantageous Effects

According to the present invention, as a signal pin to be electrically connected to a substrate is configured in an L shape, a fixing force between the substrate and a connector is increased, a longer length of a signal pin is secured, and thus frequency characteristics can be maintained.

Various and beneficial advantages and effects of the present invention are not limited to the above description and will be more easily understood in a process of describing specific embodiments of the present invention.

MODE FOR CARRYING OUT THE INVENTION

Hereinafter, embodiments of the present invention will be described in detail with reference to the accompanying drawings so that those skilled in the art to which the present invention pertains may easily implement the present invention.

The present invention may be implemented in various different forms and is not limited to the embodiments described herein.

Figure 1:
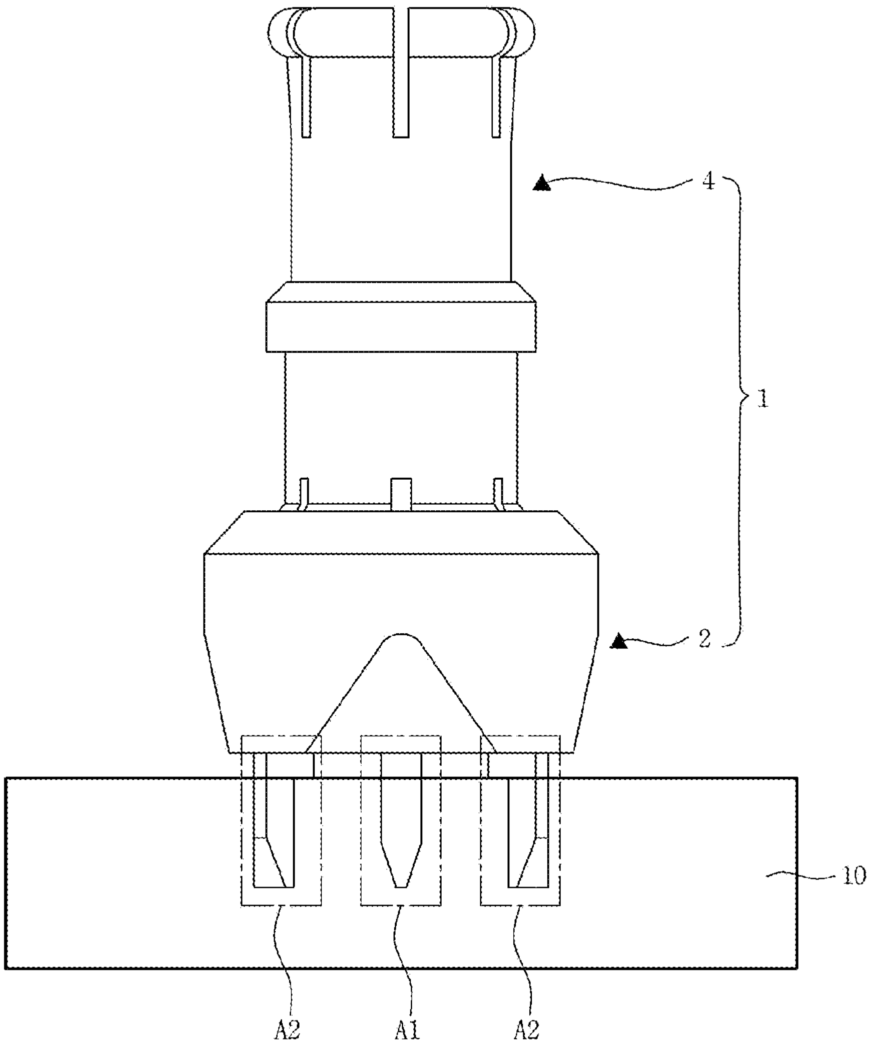
FIG. 1 is a view for describing a structure of a connector assembly according to a related art.

FIG. 1 is a view for describing a structure of a connector assembly according to a related art.

Referring to FIG. 1, a conventional connector assembly 1 includes a conventional fixed connector 2 and a conventional connection connector 4 fixed to a substrate 10, and in the conventional fixed connector 2, a signal pin A1 and a lead A2 to be fixed to the substrate 10 in a pin-in-paste (PIP) manner may be inserted into the substrate 10.

Accordingly, the conventional connector assembly 1 may secure an improved fixing force with the substrate 10 as compared to a surface mount technology (SMT) method, but the length of the signal pin A1 of the conventional fixed connector 2 is set to a length at which the signal pin A1 does not pass through the substrate 10, and thus the characteristics of a specific frequency are degraded.

Figure 2:
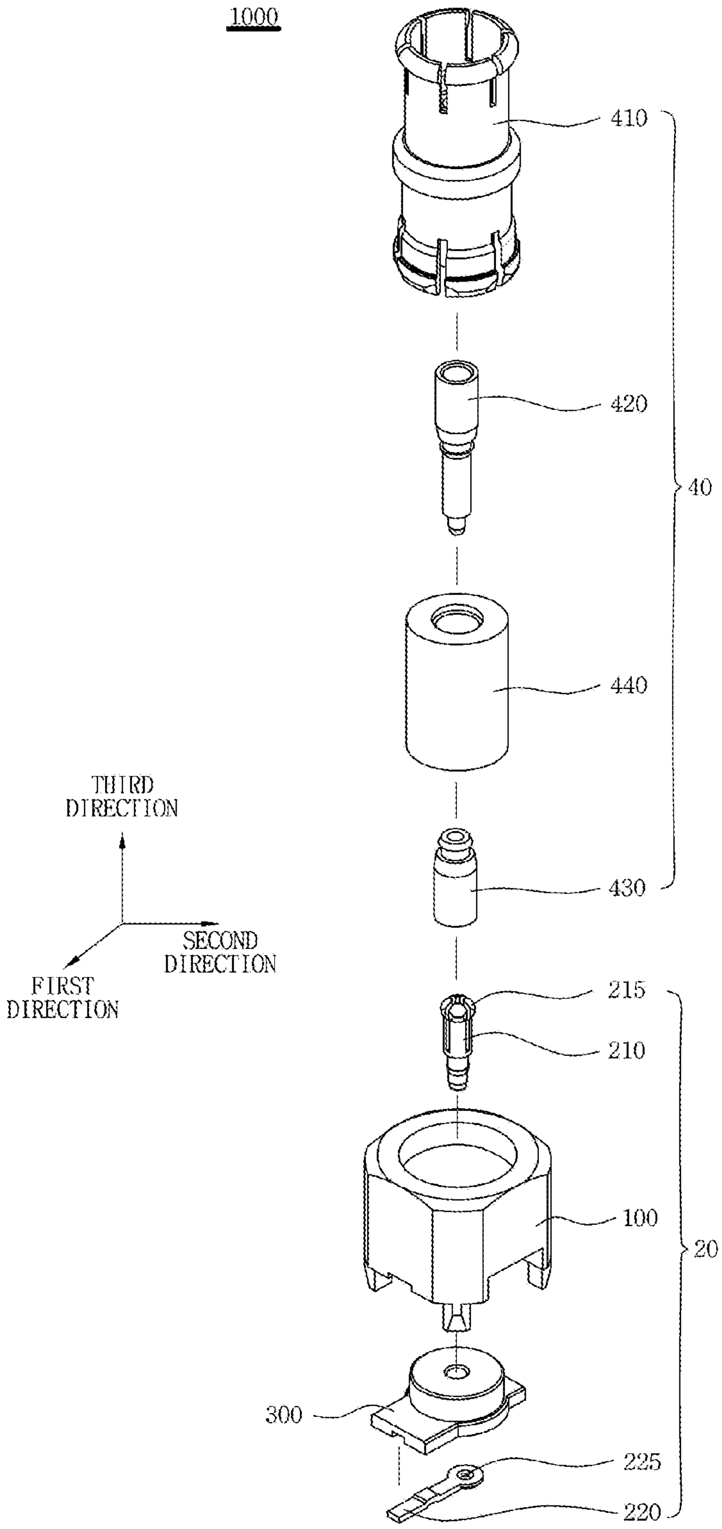
FIG. 2 is an exploded perspective view of a connector assembly according to an embodiment of the present invention.

FIG. 2 is an exploded perspective view of a connector assembly according to an embodiment of the present invention.

In order to solve the above problems, as illustrated in FIG. 2, a connector assembly 1000 according to an embodiment of the present invention may include a fixed connector 20 and a connection connector 40. In detail, the fixed connector 20 may be fixed to the substrate 10, the connection connector 40 may be coupled to a device (for example, a connector), and thus an electrical signal may be supplied between the fixed connector 20 and the device (for example, a connector). For example, the connection connector 40 may be coupled to the device in a female/male connector structure.

The fixed connector 20 may include a solderable body 100, a signal pin 200 including a first signal pin 210 and a second signal pin 220 through which an electrical signal is transmitted, and a dielectric 300 that insulates the signal pin 200 and the body 100 from each other. The second signal pin 220 may include a coupling hole 225 to be fixed to one end of the first signal pin 210, and the signal pin 200 may be formed in an L shape in which the second signal pin 220 is bent in first and second directions from the first signal pin 210 through the coupling hole 225.

In addition, the first and second signal pins 210 and 220 may be coupled in various ways through the coupling hole 225. For example, the first signal pin 210 may be press-fitted into the coupling hole 225 to be coupled, the first signal pin 210 may protrude and be inserted into the coupling hole 225 and then coupled to the coupling hole 225 in a rivet manner, and the first signal pin 210 may be also coupled to the coupling hole 225 through screw grooves formed outside one end of the first signal pin 210 and inside the coupling hole 225 of the second signal pin 220.

The second signal pin 220 may be disposed such that a portion thereof is exposed to the outside of the body 100 and may be electrically connected to a signal electrode SE formed on the substrate 10 in a partial region thereof exposed to the outside by soldering.

Meanwhile, although it is described in FIG. 2 that the first and second signal pins 210 and 220 of the fixed connector 20 are separated, the first and second signal pins 210 and 220 may be integrally formed.

The connection connector 40 may include a connection body 410, first and second connection conductors 420 and 430, and a connection dielectric 440. The first and second connection conductors 420 and 430 may be inserted into the connection body 410 and may be insulated from the connection body 410. The connection dielectric 440 may be inserted into the connection body 410, and may insulate the first and second signal pins 210 and 220 and the first and second connection conductors 420 and 430 from each other.

The connection body 410 may be coupled to the body 100 of the fixed connector 20, and thus the first and second signal pins 210 and 220 of the fixed connector 20 may be electrically connected to the first and second connection conductors 420 and 430. In detail, both ends of the first and second connection conductors 420 and 430 include connection grooves (not illustrated), and one end of the first signal pin 210 may be inserted into and coupled to the connection grooves located at ends of the first and second connection conductors 420 and 430. Further, a signal pin of the device may be inserted into and coupled to the connection grooves formed at the other ends of the first and second connection conductors 420 and 430.

Although it is described in FIG. 2 that the first and second connection conductors 420 and 430 of the connection connector 40 are separated, the first and second connection conductors 420 and 430 may be integrally formed.

Meanwhile, a coupling portion 215 may be formed at one end of the first signal pin 210 coupled to and inserted into the first and second connection conductors 420 and 430 so that the first signal pin 210 is inserted and then maintains a contact state. In detail, the coupling portion 215 of the first signal pin 210 is formed as a slit so that the size of the diameter may be adjusted, and thus inserted into the connection grooves, and the contact state may be maintained by the coupling portion 215.

Hereinafter, a structure of the fixed connector 20 in which the fixing force with the substrate 10 is increased and radio frequency (RF) characteristics are maintained will be described in more detail.

Figure 3:
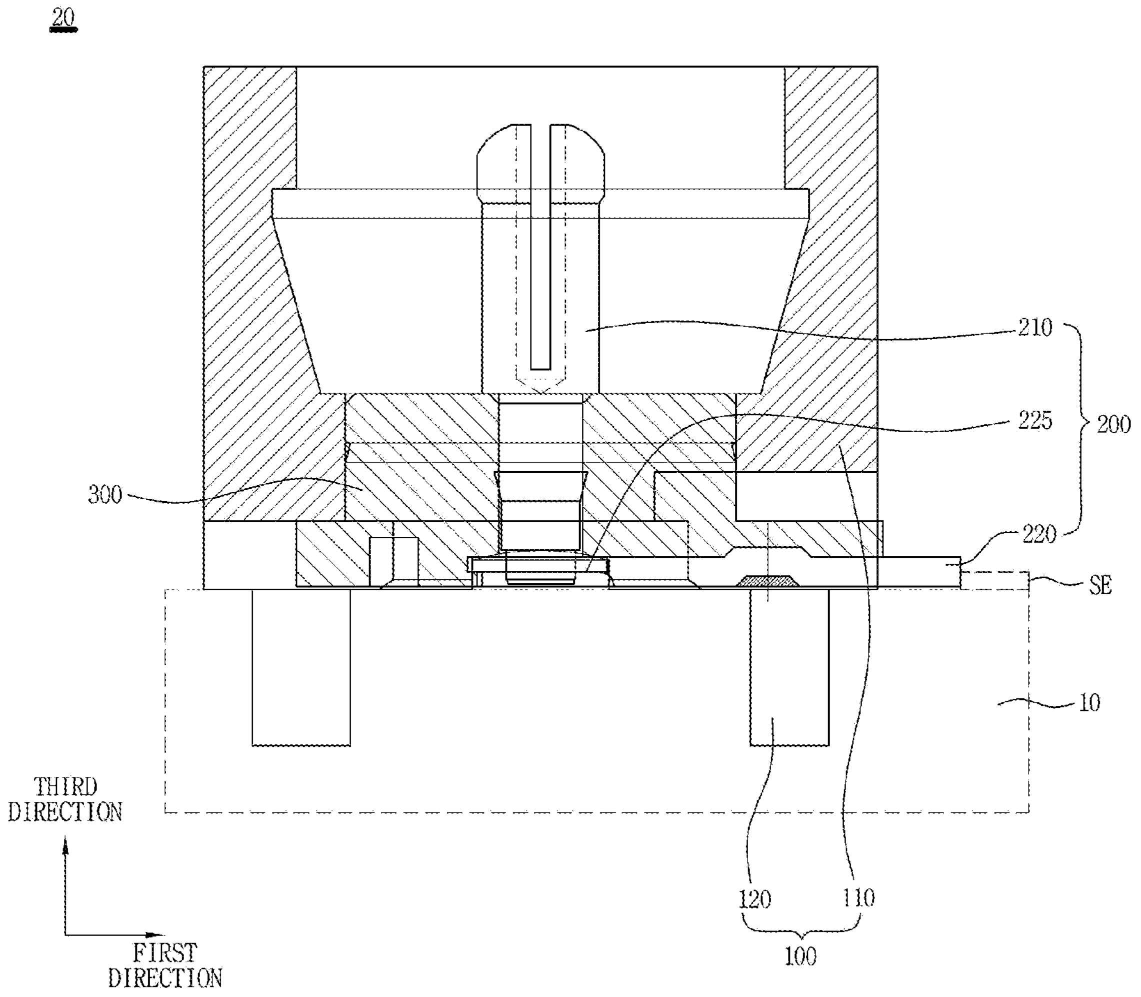
FIG. 3 is a cross-sectional view of a fixed connector according to an embodiment of the present invention.

FIG. 3 is a cross-sectional view of a fixed connector according to an embodiment of the present invention.

As illustrated in FIG. 3, the fixed connector 20 according to the embodiment of the present invention may include the body 100, the first signal pin 210, the second signal pin 220, and the dielectric 300.

The body 100 may be inserted into and fixed to the substrate 10 through a soldering method and may include a body part 110 that is a region coupled to the connection connector 40 and a plurality of leads 120 that are regions inserted and soldered into the substrate 10. In this way, as the leads 120 of the body 100 are coupled to the substrate 10 in a PIP manner, the fixing force with the substrate 10 can be improved as compared to an SMD method.

The body 100 may have a hollow shape so that the first signal pin 210 may be inserted thereinto and may be insulated from the first signal pin 210.

The first signal pin 210 may be inserted into the body 100. The first signal pin 210 is insulated from the body 100 but may be electrically connected to the first and second connection conductors 420 and 430 at one end thereof and electrically connected to the second signal pin 220 at the other end thereof.

The second signal pin 220 may be disposed on the substrate 10 and may be electrically connected to the first signal pin 210 through the coupling hole 225 formed at one end thereof. In detail, as the one end of the first signal pin 210 is inserted into the coupling hole 225 formed at the one end of the second signal pin 220, the two signal pins 210 and 220 may be electrically connected. The second signal pin 220 may not be inserted into the substrate 10, may be disposed in parallel on the substrate 10, and may be electrically connected to the signal electrode SE formed on the substrate 10 through soldering.

In this case, a portion of the second signal pin 220 exposed to the outside of the body 100 may be electrically connected to the signal electrode SE formed on the substrate 10 through soldering.

That is, the second signal pin 220 disposed on the substrate 10 may be disposed on the substrate 10 to be longer than the thickness of the substrate 10, and by securing the length of the signal pin 200 in an L shape, RF loss occurring at a high frequency of, for example, 3 GHz or more can be reduced while increasing a fixing force between the substrate 10 and the fixed connector 20. Further, since the portion of the second signal pin 220 exposed to the outside of the body 100 is soldered to the signal electrode SE formed on the substrate 10, the occurrence of a cold solder joint can be prevented.

Meanwhile, the signal pin 200 of the fixed connector 20 is not separated into two parts and may be formed in an integral form in which one side thereof may be inserted into the body 100 and the other side thereof extending from the one side is disposed to extend on the substrate 10. Accordingly, the signal pin 200 may be bent at a portion in contact with the substrate 10 to form an L shape.

The dielectric 300 may couple the signal pin 200 and the body 100. In the dielectric 300, the first and second signal pins 210 and 220 are arranged inside the hollow inner space of the body 100, and thus the body 100 may be physically coupled to the first and second signal pins 210 and 220 while insulated from the first and second signal pins 210 and 220.

Figure 4A:
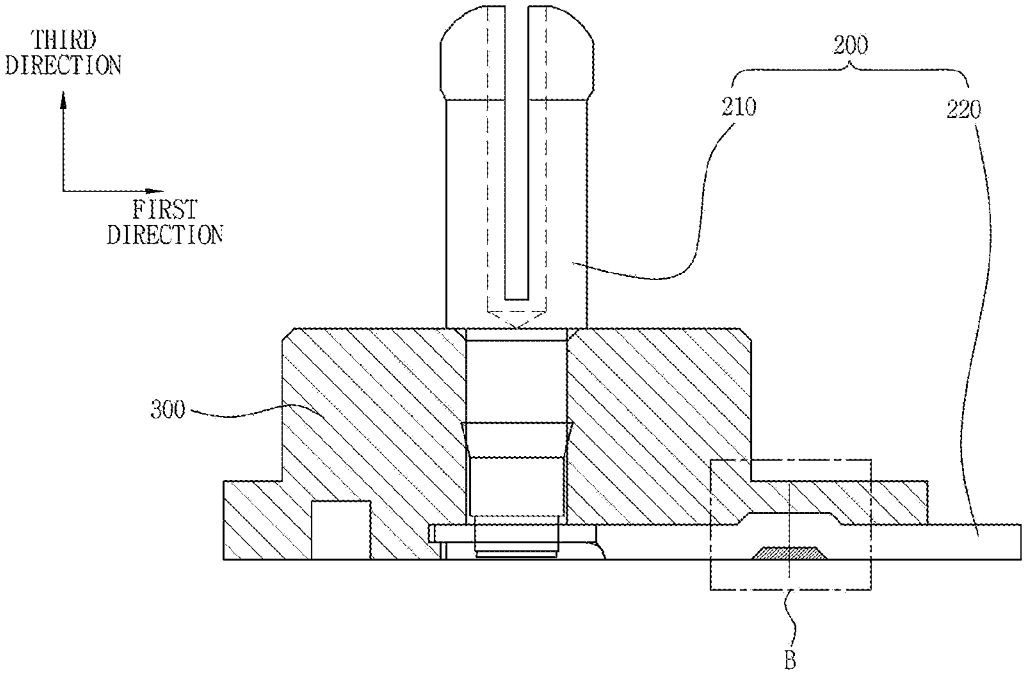
FIG. 4A is an enlarged cross-sectional view illustrating only a partial configuration of the fixed connector according to an embodiment of the present invention.
Figure 4B:
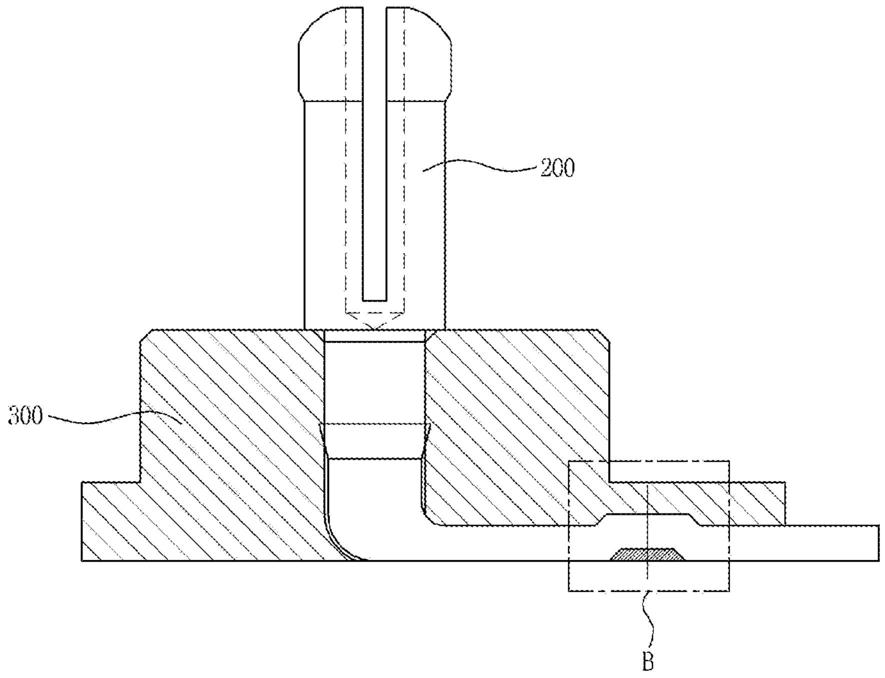
FIG. 4B is an enlarged cross-sectional view illustrating only a partial configuration of the fixed connector according to an embodiment of the present invention.

FIG. 4A and FIG. 4B is an enlarged cross-sectional view illustrating only a partial configuration of the fixed connector according to an embodiment of the present invention.

As illustrated in FIGS. 4A and 4B, the signal pin 200 may be divided into the first and second signal pins 210 and 220 or may be integrally formed, and the dielectric 300 may couple the signal pin 200 having an L shape to the inside of the body 100.

To this end, the dielectric 300 may be injection-molded with the signal pin 200. As the dielectric 300 is injection-molded, the dielectric 300 may fill an empty space B formed in an arcuate shape of the second signal pin 220, and a fixing force between the dielectric 300 and the signal pin 200 can be more increased as compared to a case in which the second signal pin 220 has a flat structure.

Meanwhile, the dielectric 300 may be formed of various synthetic resin-based materials and may be formed of a heat-resistant material, thereby reducing deformation due to heat of soldering. For example, the dielectric 300 may be formed of a material such as a liquid crystal polymer (LCP), polyphenylene sulfide (PPS), polyphenylene oxide (PPO), polyetheretherketone (PEEK), and polyether imide (ULTEM).

Hereinabove, a case in which the dielectric 300 is integrally formed has been described, but the dielectric 300 may have a separate structure to couple each of the first and second signal pins 220 to the body 100, and a detailed description thereof will be made below.

Figure 5A:
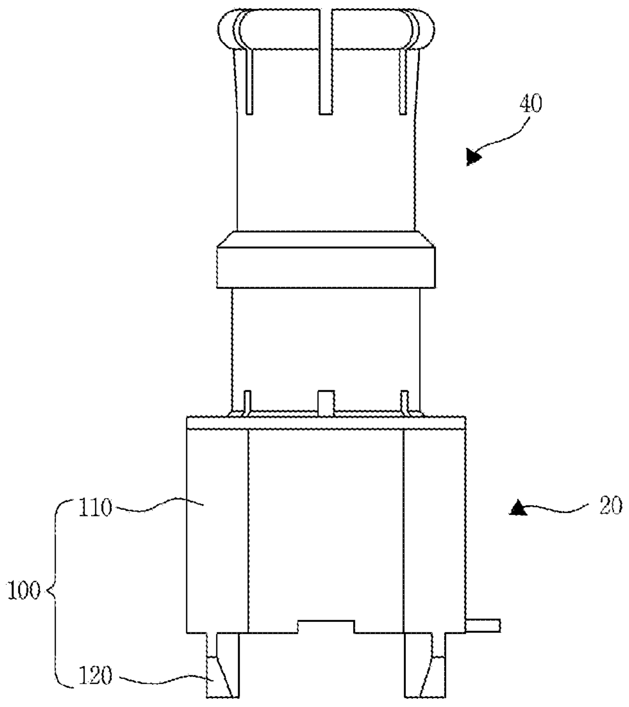
FIG. 5A is a view for describing a body of the fixed connector according to an embodiment of the present invention.
Figure 5B:
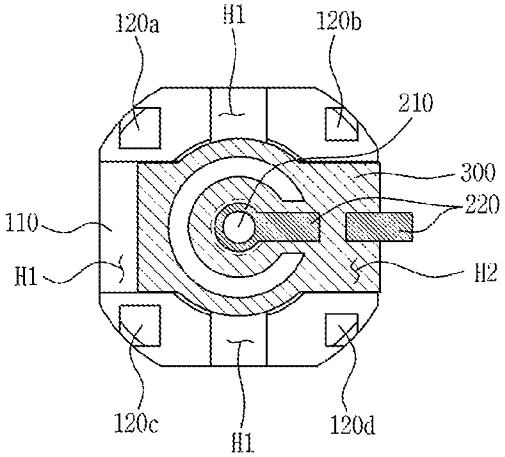
FIG. 5B is a view for describing a body of the fixed connector according to an embodiment of the present invention.

FIG. 5A and FIG. 5B is a view for describing a body of the fixed connector according to an embodiment of the present invention.

As illustrated in FIG. 5A, the body 100 of the fixed connector 20 may include the body part 110 and the plurality of leads 120. The body 100 may be made of a metal material and may be electrically insulated from the first and second signal pins 210 and 220 by the dielectric 300.

The body part 110 may surround the first signal pin 210, which is inserted into the body 100, among the signal pin 200. A vertical cross section of the body part 110 with respect to the first signal pin 210 as a central axis may be symmetrical in a left-right direction based on a direction in which the second signal pin 220 is oriented.

That is, unlike the conventional connector assembly 1, even when the second signal pin 220 protrudes from an outer surface of the body part 110, the body part 110 is symmetrical in the left-right direction, and thus the fixed connector 20 may be more easily picked up and seated on the substrate 10.

The plurality of leads 120 may be connected to a lower portion of the body part 110 of the body 100 and inserted into the substrate 10. The body part 110 and the plurality of leads 120 may be integrally formed, and may be inserted into and soldered to the substrate 10 in an integrally formed state, and thus the fixed connector 20 may be stably fixed to the substrate 10.

As illustrated in FIG. 5B, a plurality of grooves may be formed between the plurality of leads 120 on a bottom surface of the body part 110. For example, in the body part 110, first grooves H1 may be formed between a first lead 120*a* and a second lead 120*b*, between the first lead 120*a* and a third lead 120*c*, and between the third lead 120*c* and a fourth lead 120*d*, and a second groove H2 may be formed between the second lead 120*b* and the fourth lead 120*d.*

Among them, the second groove H2 through which the second signal pin 220 passes may be formed to have a greater width or height than the remaining first groove H1, and through these empty spaces, even when the signal pin 200 is formed in an L shape, return loss and insertion loss values of the fixed connector 20 can be maintained.

The first and second grooves H1 and H2 may separate a bottom surface of the body part 110 based on each of the plurality of leads 120. The bottom surface of the separated body part 110 is seated on and soldered to a ground electrode GE of the substrate 10 formed separately based on each of grooves into which the plurality of leads 120 are inserted, and thereby alignment between the fixed connector 20 and the substrate 10 can be improved utilizing the surface tension of the soldering.

The plurality of leads 120 may be formed in a bar shape at an edge of the bottom surface of the body part 110 and may be asymmetrical in the left-right direction. In detail, as the signal pin 200 of the fixed connector 20 has an L shape, when the existing process is used without change, a situation may occur in which the second signal pin 220 of the fixed connector 20 is not properly seated on the signal electrode SE formed on the substrate 10.

Accordingly, the fixed connector 20 may provide a difference in the shape of the plurality of leads 120. According to an embodiment, in the plurality of leads 120, the cross section of one or more of the leads 120 may be different from the cross section of the other leads 120. For example, a horizontal cross-sectional shape of the first lead 120*a* among the plurality of leads 120 may be circular, and a horizontal cross-sectional shape of the remaining second, third, and fourth leads 120*b*, 120*c*, and 120*d* may be quadrangular. As another example, among the plurality of leads 120, the thickness of the first and third leads 120*a* and 120*c* may be greater or smaller than the thickness of the second and third leads 120*b* and 120*d.*

In this way, as the body part 110 has the symmetrical shape but the plurality of leads 120 have the asymmetrical shape, wrong insertion of the fixed connector 20 onto the substrate 10 is prevented, and thus the second signal pin 220 may be correctly seated on the signal electrode SE formed on the substrate 10.

Figure 6A:
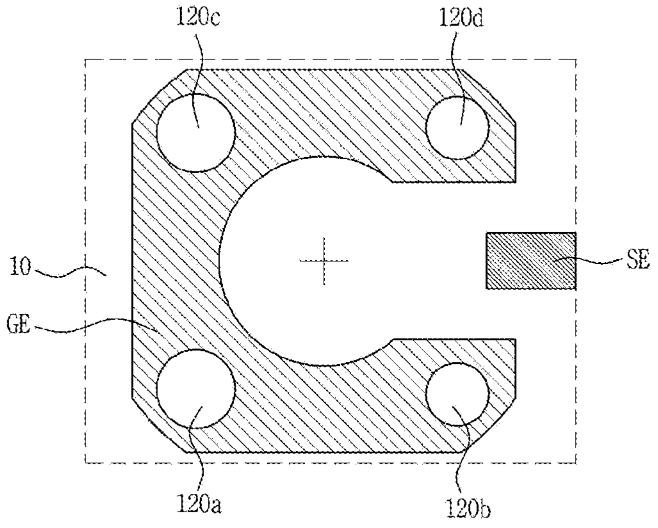
FIG. 6A is a view for describing a signal electrode and a ground electrode formed on a substrate.
Figure 6B:
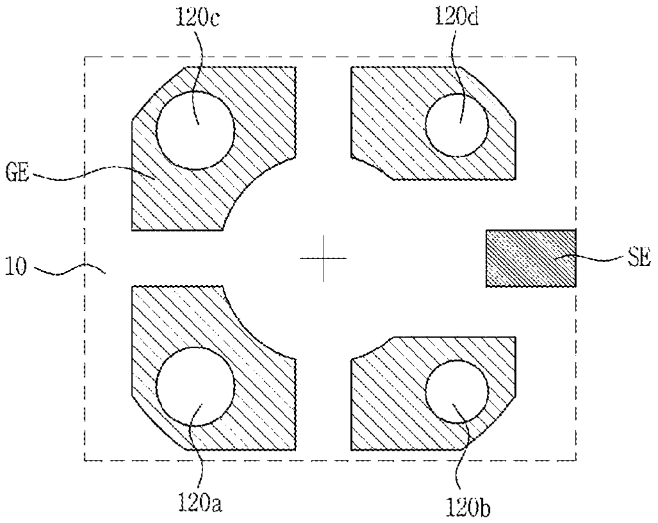
FIG. 6B is a view for describing a signal electrode and a ground electrode formed on a substrate.

Meanwhile, FIG. 6A and FIG. 6B is a view for describing the signal electrode SE and the ground electrode GE formed on the substrate 10.

Referring to FIG. 6 and FIG. 6, the signal electrode SE on which the second signal pin 220 is seated is formed, and the ground electrode GE may not be separated as in FIG. 6A or may be separated as in FIG. 6B.

The plurality of grooves into which the plurality of leads 120 are inserted may be formed in the substrate 10, and the plurality of grooves may have shapes corresponding to the shapes of the leads 120. For example, when the horizontal cross-sectional shape of the first lead 120*a* is circular and the horizontal cross-sectional shape of the remaining second, third, and fourth leads 120*b*, 120*c*, and 120*d* is quadrangular among the plurality of leads 120, a horizontal cross-sectional shape of the groove into which the first lead 120*a* is inserted may be circular, and a horizontal cross-sectional shape of the grooves into which the second, third, and fourth 120*b*, 120*c*, and 12*d* are inserted may be quadrangular. As another example, when the thickness of the first and third leads 120*a* and 120*c* is greater or smaller than the thickness of the second and fourth leads 120*b* and 120*d* among the plurality of leads 120, the thickness of the grooves into which the first and third leads 120*a* and 120*c* are inserted may be greater or smaller than the thickness of the grooves into which the second and fourth leads 120*b* and 120*d* are inserted.

Figure 7A:
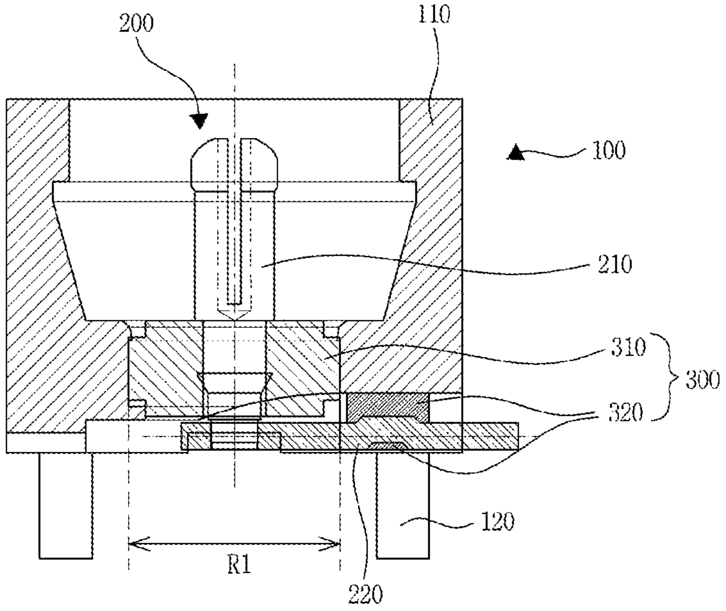
FIG. 7A is a view for describing a coupling structure of the fixed connector using a dielectric according to an embodiment of the present invention.
Figure 7B:
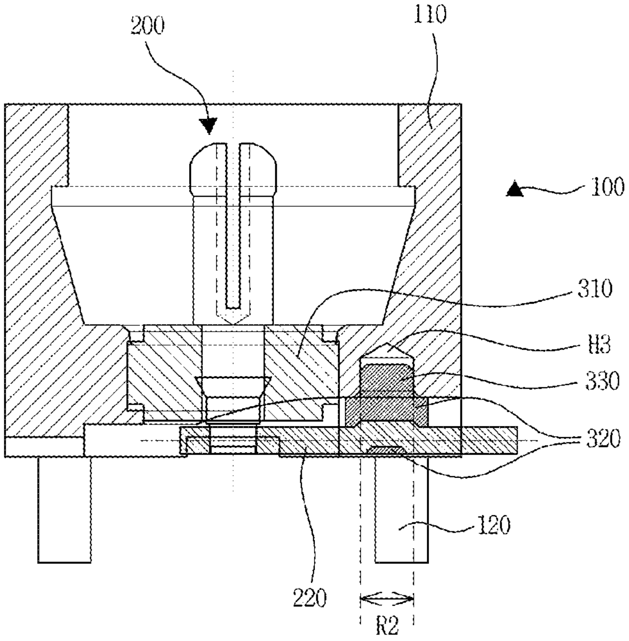
FIG. 7B is a view for describing a coupling structure of the fixed connector using a dielectric according to an embodiment of the present invention.

FIG. 7A and FIG. 7B is a view for describing a coupling structure of the fixed connector using a dielectric according to an embodiment of the present invention.

As illustrated in FIG. 7A, the dielectric 300 may include a first dielectric 310 surrounding the first signal pin 210 among the signal pin 200 and a second dielectric 320 surrounding the second signal pin 220 among the signal pin 200. Among them, the first dielectric 310 is disposed to surround a lower end of the first signal pin 210, a horizontal cross section of a protruding region is formed identical or similar to a horizontal cross section of the inner space of the body 100, and thus the first dielectric 310 may be fitted into the inner space of the body 100.

In this way, in a state in which the diameter R1 of the first dielectric 310 and the diameter R1 of the inner space of the body 100 are identical or similar to each other, the first dielectric 310 and the inner space of the body 100 are fitted to each other and may thus be coupled without a separate fixing member.

Further, as illustrated in FIG. 7B, the body part 110 of the body 100 may have a groove H3 for coupling with the second dielectric 320. In detail, the second dielectric 320 may have a press-fitting protrusion 330 to be coupled to the body 100 in a direction toward an upper end of the body 100.

That is, in a state in which a diameter R2 of the press-fitting protrusion 330 and the diameter of the groove H3 are identical or similar to each other, the press-fitting protrusion 330 and the groove H3 may be fitted to each other. The press-fitting protrusion 330 and the groove H3 are arranged at a location corresponding to the second signal pin 220, which is disposed on the substrate 10, among the signal pin 200, and thus a fixing force between the second signal pin 220 and the body 100 can be increased.

Figure 8A:
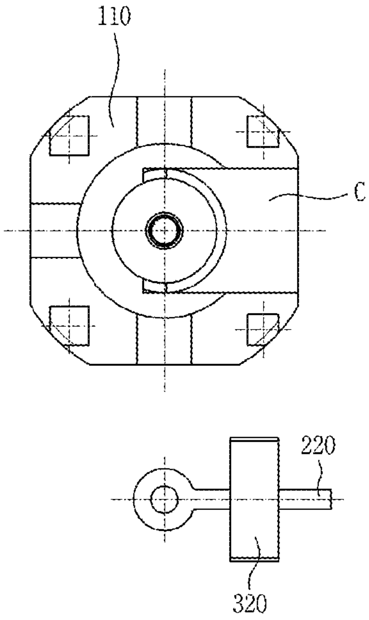
FIG. 8A is a view for describing a shape of a dielectric included in the fixed connector according to an embodiment of the present invention.
Figure 8B:
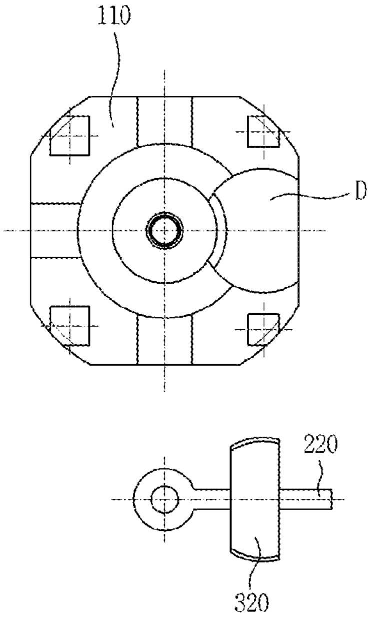
FIG. 8B is a view for describing a shape of a dielectric included in the fixed connector according to an embodiment of the present invention.

FIG. 8A and FIG. 8B is a view for describing a shape of a dielectric included in the fixed connector according to an embodiment of the present invention.

As illustrated in FIG. 8A and FIG. 8B, the shape of the bottom surface of the second dielectric 320 for coupling with the second signal pin 220 may have various shapes depending on the shape of grooves C and D formed in the body part 110. For example, the shape of the bottom surface of the second dielectric 320 may be at least a partial shape of a quadrangle or a circle.

Among them, in the case of a rectangular groove C formed in the body part 110, a lot of time and money may be consumed to make a rectangle through a cutting tool. Accordingly, as the second dielectric 320 is formed in at least a portion shape of a circle by forming, with a drill, one region for coupling the second signal pin 220, which is disposed on the substrate 10, among the signal pin 200, to the body 100, the existing process using a cutting tool can be simplified and manufacturing costs of the fixed connector 20 can be reduced.

FIG. 9A, FIG. 9B, FIG. 9C and FIG. 9D is a view for describing a method of adjusting the radio frequency (RF) characteristics of the fixed connector according to an embodiment of the present invention.

As illustrated in FIG. 9A, FIG. 9B, FIG. 9C and FIG. 9D, the fixed connector 20 may adjust RF characteristics through the shape of the dielectric 300. In detail, in the dielectric 300, at least one circular groove H4 as in FIGS. 9A and 9B may be formed in a bottom surface corresponding to the substrate 10 or an annular groove H5 may be formed to be open in a direction in which the second signal pin 220 disposed on the substrate 10 is oriented as in FIG. 9C on the basis of a center of the first signal pin 210, which is inserted into the body 100, among the signal pin 200.

In this way, as the grooves H4 and H5 are formed in the dielectric 300, an air hole may be formed in the fixed connector 20, and the RF characteristics can be adjusted according to the size (the volume) of the air hole. However, the groove may not be formed in the bottom surface of the dielectric 300 as in FIG. 9D depending on process convenience rather than the RF characteristics.

Further, in the present invention, a plurality of circular grooves H4 may be arranged in a circular shape based on the center of the first signal pin 210. Further, in the present invention, although it has been described that there is one annular groove H5, the number of annular grooves H5 may be two or more. For example, a plurality of grooves H5 having a ring shape or an arcuate shape may be arranged in a circular shape based on the center of the first signal pin 210, and various ring-shaped grooves H5, which are not limited thereto, may be formed in the dielectric 300. In addition, the shape of the bottom surface of the dielectric 300 may extend as in FIG. 9B according to the length of the signal electrode SE formed on the substrate 10 to prevent lead-rising of the fixed connector 20.

Figure 9A:
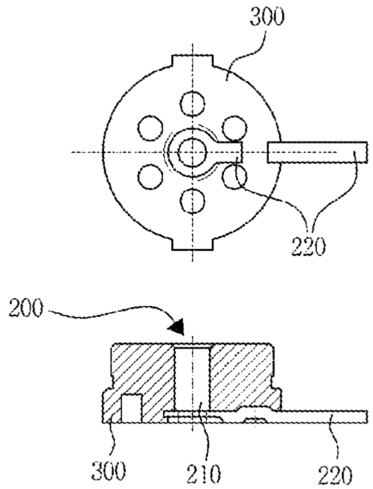
FIG. 9A is a view for describing a method of adjusting the radio frequency (RF) characteristics of the fixed connector according to an embodiment of the present invention.
Figure 9B:
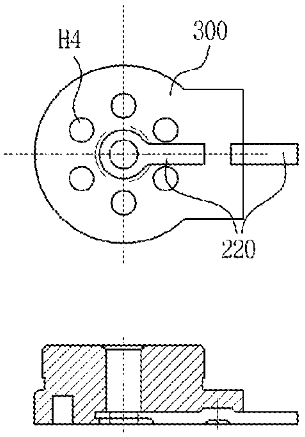
FIG. 9B is a view for describing a method of adjusting the radio frequency (RF) characteristics of the fixed connector according to an embodiment of the present invention.
Figure 9C:
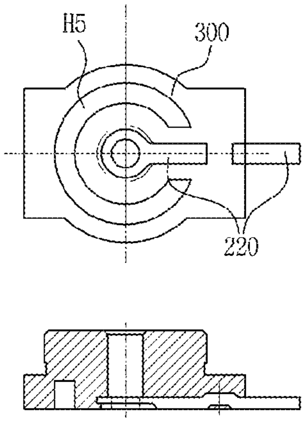
FIG. 9C is a view for describing a method of adjusting the radio frequency (RF) characteristics of the fixed connector according to an embodiment of the present invention.
Figure 9D:
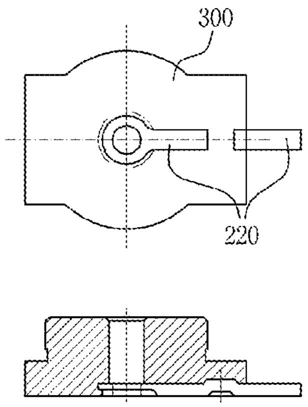
FIG. 9D is a view for describing a method of adjusting the radio frequency (RF) characteristics of the fixed connector according to an embodiment of the present invention.

Further, the dielectric 300 may extend in a direction opposite to a direction toward the second signal pin 220 as in FIGS. 9C and 9D to adjust the RF characteristics.

Figure 10:
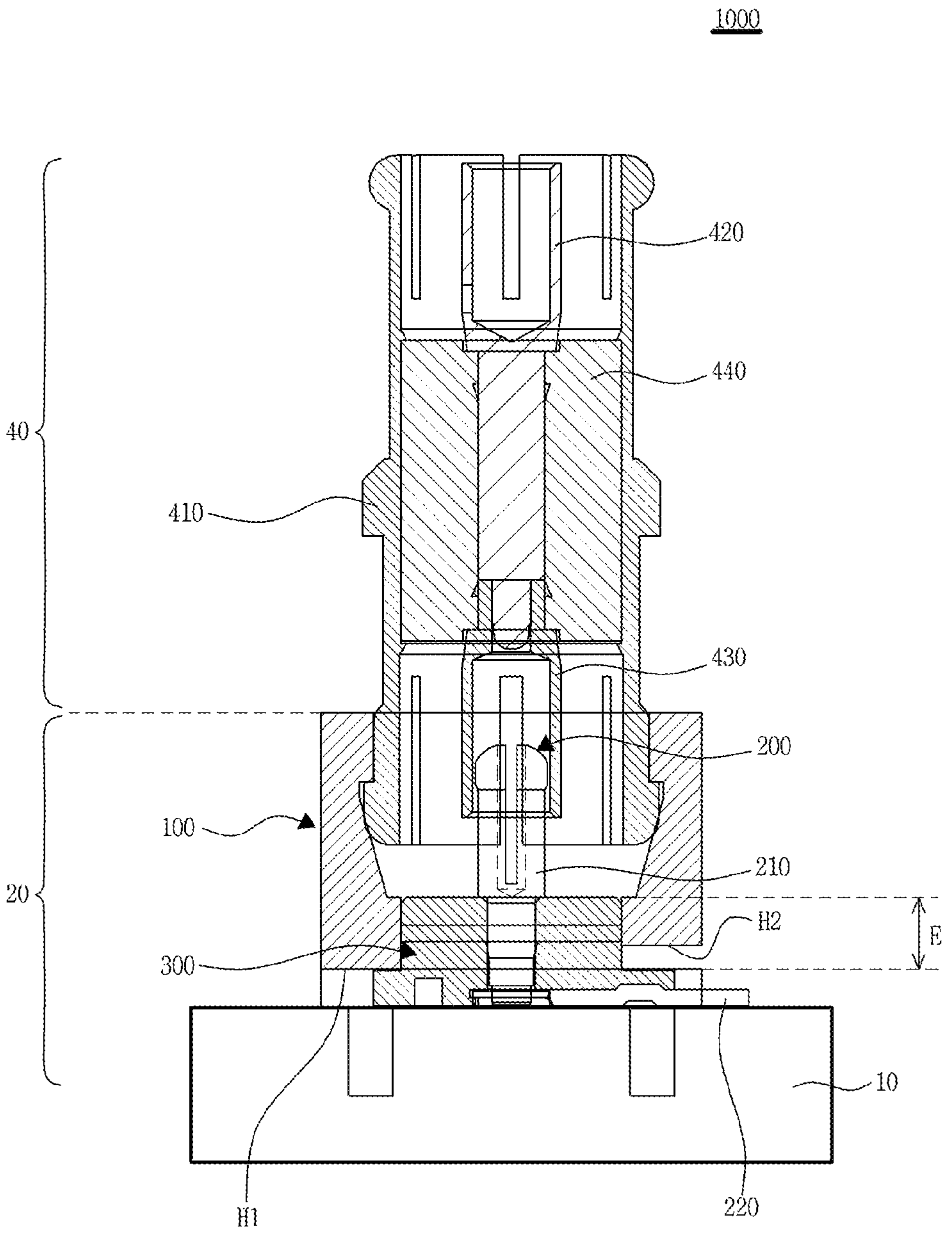
FIG. 10 is a view for describing a method of improving the characteristics of the connector assembly according to an embodiment of the present invention.

FIG. 10 is a view for describing a method of improving the characteristics of the connector assembly according to an embodiment of the present invention.

As illustrated in FIG. 10, in the body 100, the second groove H2 may be formed such that the second signal pin 220, among the signal pin 200, disposed on the substrate 10 passes therethrough.

An air gap E in which the body 100 and the substrate 10 may be spaced apart from each other may be formed in the second groove H2. That is, the air gap E may be formed between the body 100 and the dielectric 300 on a region in which the second signal pin 220 is disposed. In this way, as the air gap E is formed in the second groove H2 formed in the body 100, the power capacity of the connector assembly 1000 can be increased, heat generation of the connector assembly 1000 can be reduced, and the influence on the power capacity of the connector assembly 1000 can be minimized even when the amount of lead applied to the second signal pin 220 is increased, as compared to a state in which there is no air gap E.

Meanwhile, a gap (the height of the air gap E) between the body 100 and the dielectric 300 may be adjusted, and as needed, the height of the dielectric 300 is increased to come into contact with the body 100, and thus no gap may be present between the body 100 and the dielectric 300.

Further, since the length of the signal pin 200 may be longer due to the presence of the second groove H2, the return loss and insertion loss values may be maintained even when the signal pin 200 has an L shape.

The first groove H1 may be formed on the other side of the bottom surface of the body 100 facing the second groove H2 formed on one side of the bottom surface of the body 100. The second groove H2 may have a width greater than that of the first groove H1 or the height of the air gap formed through the second groove H2 may be greater than the height of the air gap formed through the first groove H1.

Hereinabove, the present invention has been described in detail through exemplary embodiments, but the present invention is not limited thereto and may be variously implemented within the scope of the appended claims.

What is claimed is:

1. A fixed connector, comprising:
- a body fixedly inserted into a substrate;
- a signal pin comprising one side inserted into the body and the other side extending from the one side to be disposed on the substrate; and
- a dielectric coupling the signal pin and the body,
- wherein a portion of the signal pin has an L shape to be in contact with the substrate, and the portion of the signal pin is exposed to an outside of the body,
- wherein the signal pin includes:
  - a first signal pin inserted into the body, and
  - a second signal pin disposed on the substrate and electrically connected to the first signal pin, and
- wherein in the first signal pin and the second signal pin, an end portion of the first signal pin is coupled to the second signal pin through a coupling hole formed in the second signal pin.

2. The fixed connector of claim 1, wherein the body includes:
- a body part surrounding the first signal pin among the signal pin; and a plurality of leads integrally formed with the body part, connected to a lower portion of the body part, and inserted into the substrate, wherein the body part has a vertical cross section that is symmetrical in a left-right direction with respect to a central axis in a direction in which the second signal pin, which is disposed on the substrate, among the signal pin is oriented, and wherein the plurality of leads are each formed in a rod shape at an edge of a bottom surface of the body part and are asymmetric in the left-right direction.

3. The fixed connector of claim 1, wherein, in the signal pin, one region of the second signal pin disposed on the substrate has an arcuate shape.

4. The fixed connector of claim 1, wherein the dielectric is disposed to surround a lower end of the signal pin, and a cross section of a protruding region of the dielectric is identical or similar to a cross section of an inner space of the body so that the dielectric is fixedly fitted into the inner space of the body.

5. The fixed connector of claim 1, wherein the body comprises an air gap between the body and the dielectric disposed on the second signal pin, which is disposed on the substrate, among the signal pin.

6. The fixed connector of claim 2, wherein a cross section of one or more of the plurality of leads is different from a cross section of the remaining leads.

7. The fixed connector of claim 4, wherein the body comprises a groove for coupling with the dielectric, wherein the dielectric comprises a press-fitting protrusion for coupling with the body in a direction toward an upper end of the body, and wherein the groove and the press-fitting protrusion are arranged at a location corresponding to athe second signal pin, which is disposed on the substrate, among the signal pin.

8. The fixed connector of claim 4, wherein one region of the dielectric for coupling the second signal pin, among the signal pin, disposed on the substrate to the body has at least a partial shape of a circle.

9. The fixed connector of claim 4, wherein, in the dielectric, at least one circular groove is formed in a bottom surface corresponding to the substrate or an annular groove is formed to be open in a direction in which the second signal pin disposed on the substrate is oriented on the basis of a center of the first signal pin, which is inserted into the body, among the signal pin.

10. A fixed connector, comprising:

a body fixedly inserted into a substrate;

a signal pin comprising one side inserted into the body and the other side extending from the one side to be disposed on the substrate; and a dielectric coupling the signal pin and the body, wherein a portion of the signal pin has an L shape to be in contact with the substrate, and the portion of the signal pin is exposed to an outside of the body, wherein the signal pin includes:

a first signal pin inserted into the body, and a second signal pin disposed on the substrate and electrically connected to the first signal pin, wherein the dielectric includes:

a first dielectric surrounding the first signal pin, and a second dielectric surrounding the second signal pin, and wherein a shape of a bottom surface of the second dielectric coupling the second signal pin corresponds to a shape of a groove formed in the body.

11. A fixed connector, comprising:

a body fixedly inserted into a substrate;

a signal pin comprising one side inserted into the body and the other side extending from the one side to be disposed on the substrate; and a dielectric coupling the signal pin and the body, wherein a portion of the signal pin has an L shape to be in contact with the substrate, and the portion of the signal pin is exposed to an outside of the body, wherein the signal pin includes:

a first signal pin inserted into the body, and a second signal pin disposed on the substrate and electrically connected to the first signal pin, and wherein the body includes:

a second groove through which the second signal pin, which is disposed on the substrate, among the signal pin passes, and a first groove formed in one side of a bottom surface of the body facing the second groove formed in the other side of the bottom surface of the body.

* * * * *